July 5, 1966  A. RIST  3,258,856
METHOD AND DEVICE FOR THE STUDY ON A REDUCED SCALE OF
THE STEADY-STATE OPERATION OF A REACTOR, MORE
PARTICULARLY OF A BLAST-FURNACE
Filed April 3, 1963  2 Sheets-Sheet 1

INVENTOR
Andre Rist
BY
Michael S. Striker
ATTORNEY

United States Patent Office 3,258,856
Patented July 5, 1966

3,258,856
METHOD AND DEVICE FOR THE STUDY ON A REDUCED SCALE OF THE STEADY-STATE OPERATION OF A REACTOR, MORE PARTICULARLY OF A BLAST-FURNACE
André Rist, St. Germain-en-Laye, France, assignor to Institut de Recherches de la Siderurgie Francaise, St. Germain-en-Laye, France, a professional institution of France
Filed Apr. 3, 1963, Ser. No. 270,437
Claims priority, application France, Apr. 10, 1962, 893,947, Patent 1,327,837
5 Claims. (Cl. 35—18)

The invention relates to a method and device for the study on a reduced scale of the steady state operation of a reactor, and more particularly of a blast-furnace.

Methods of laboratory study of the reactions which take place between fluids and solids do not make it possible as a rule to achieve the conditions of steady-state operation of an industrial reactor of the type employing streams of fluids and solids in which the reacting products pass through a well-determined continuous sequence of temperatures and different compositions.

It is not possible by means of such methods to obtain satisfactory information on the successive stages of a continuous reaction process, except by performing a large number of experiments, during which it proves necessary to pass through transient states which are different from the steady-state operation as observed in a plant for treatment in continuous working. In a general manner, it is always desirable to carry out experiments under the actual conditions of operation of the model which is studied.

The main object of the present invention is to permit the convenient, accurate and complete study of any particular process of continuous chemical reaction between at least one stream of fluid and at least one stream of substances and, with this end in view, to produce on a reduced scale the physical and chemical conditions of the steady-state operation of an industrial thermal reactor in continuous working of the type which employs streams of fluids and solids.

This and other objects and advantages are obtained in accordance with the invention by ensuring the simulation on a small scale of the steady-state operation of an industrial thermal reactor, in particular of an industrial furnace with a reduction shaft in continuous working or of a blast furnace, wherein there is heated a portion of constant length of a reaction tube following a thermal outline or graduation which corresponds to that of the shaft of an industrial reactor, the heating zone of said reaction tube is displaced along this latter so as to ensure a constant temperature graduation of said heating zone in such manner as to reconstitute the relative movements of substances, of fluids, and of the thermal reaction zone which take place under the conditions of steady-state operation of a continuous treatment industrial plant, and a stream of reacting fluid which is being studied is at the same time caused to flow through the reaction tube over samples of reacting substances which are placed inside said reaction tube.

The heating zone may be displaced along said reaction tube while imparting either to a heat source or to the tube or both a movement of progression in a direction which coincides with the axis of said tube.

In one embodiment of the invention, the reaction tube is filled with chemically inert solid substances over a length which is at least equal to that of the heating zone and with reacting substances over the remainder of the length of said tube, the sequence of filling being such that the fluid stream sweeps the reacting substances which are being studied prior to the inert substances, following which the fluid is drawn off as it is discharged from the tube while the boundary between the chemically inert substances and reacting substances describes the thermal outline.

In another embodiment, the heating and the circulation of the fluids is quickly interrupted and at least that zone of the tube which was heated at the moment of interruption of the heating is abruptly cooled, the solid products contained in the zone which is thus quenched being then extracted in successive layers.

The devised device for the practical application of the method referred-to above comprises a reaction tube of refractory material, at least one heat source surrounding the reaction tube over a part of the length of said tube and co-operating mechanically with the reaction tube in such manner as to permit of a translational movement of said heat source relatively to the reaction tube along the axis of said tube, and means for producing a translational movement of the heat source relatively to the reaction tube in a direction which coincides with the axis of said reaction tube.

Temperature scanners may be placed inside the reaction tube and means for continuous analysis may be connected to one end of said reaction tube.

In accordance with a simplified flowsheet, an industrial thermal reactor in continuous working with streams of fluids and substances can be represented during the steady-state operation by a system of fluid-circuits in which provision is made for at least one path which is common to two streams, one stream being composed of fragmentary solids, the other stream being composed of a fluid, the constituents of which have at each point of the circuit a temperature which is well defined and which is related to the said common path of said streams, with the result that the thermal outline of the system of fluid-circuits does not vary, which precisely results from the fact that a steady state of reaction has been achieved. However, the reactions take place only in one essential portion of the circuit, namely that of the "shaft," at the inlet and outlet of which the most substantial variations of temperature occur.

Any blast-furnace and similarly, any shaft furnace and generally speaking any continuous-working industrial reactor of the type employing streams of fluids and solid substances comprises the above-mentioned essential zone in which a reaction takes place between the products which are brought together, and it is this zone which is designated in this specification as the "shaft."

It will be understood that the present invention makes it possible to achieve on a very small scale the conditions of steady-state reaction in accordance with the following representation: the reaction tube which is filled with solid substances and which is swept by the fluid stream corresponds to the common fluid-circuit of a reactor, the tube zone which is heated according to a predetermined thermal profile corresponds to the shaft, and the continuous and constant displacement of said zone along the tube reconstitutes the relative motion with respect to said shaft of the solid and fluid elements as performed from the charging stage to the discharging stage.

In a chemical reactor of the countercurrent flow type, the fluids contact the solid substances derived from the shaft (that is to say, which have already been treated) before said fluids are admitted inside said shaft. This countercurrent flow condition will be readily achieved in a device in accordance with the invention by causing the fluids, which are usually gases, to circulate in the interior of the tube in that direction in which the heated zone progresses along said tube. In order to achieve the conditions of a concurrent flow reactor, it will merely be necessary to cause the fluids to circulate in the direction opposite to the progression of the heated zone.

In a scale model in accordance with the invention, the rate of charge of solid substances will be equal to the linear velocity of progression of the heating zone, and the mean axial velocity of admission and delivery of a fluid in the hot zone will be equal to the mean axial component of the velocity of flow of the fluid over the solid materials or along the walls of the tube as either reduced or increased by the velocity of progression of the heating zone, depending on whether it is desired to reproduce respectively the conditions of reaction in countercurrent flow or in concurrent flow. The fluids employed in the principal fields of study which come within the scope of the present invention are generally gases and flow through the reaction tube at velocities which are considerably higher (100 to 1,000 times) than that of the progression of the heating zone along the tube which, for example, will be of the order of a few centimeters to a few meters per hour. The result thereby achieved is that the mean influx velocity and efflux velocity of a fluid in the hot zone will practically always be equal to the means velocity of flow of said fluid through the tube, which corresponds to the case of an industrial plant with fluid-solid streams.

The invention also makes it possible to study systematically the process of a continuous chemical reaction and, with this object inview, to determine the composition of the different products which are brought together at any point of their path in a continuous-treatment device and more especially at the different levels of treatment in the shaft. The process in accordance with the invention in fact involves an abrupt quenching of the products which are present in the "shaft" or in any other reaction-tube zone which is being studied, in accordance with a very simple mode of operation which consists in stopping of the heating and of the fluid circulation, followed immediately by a cooling which is as abrupt as possible in the zone considered. The solid products of said zone can then be withdrawn in successive layers, then examined and analyzed at a convenient opportunity with a view to drawing up a diagram of the compositions of solid substances as a function of the positions respectively occupied by said substances at each successive treatment stage in relation to the thermal outline (and consequently as a function of the level of said materials in the shaft) and, in another sequence of experiments, as a function of the other parameters such as extreme temperatures, rate of charge, particle-size distribution, etc. It should be noted that it is necessary to give to the reaction tube a length which is sufficient to ensure that a steady thermal state can be established in a first portion of the path of the heated zone. The result thereby achieved is that the products and fluids which are derived from the reaction tube will only be representative of the steady state starting from a given point of the tube and downstream from said point with respect to the displacement of the heating zone.

The invention also makes it possible to determine with accuracy the successive chemical compositions of the fluids during the different phases of a continuous reaction. To this end, the charge of the tube consisting of reacting substances is replaced by a charge consisting of chemically inert substances such as, for example, alumina grains, over a length which corresponds to that of the movable temperature gradient, and through which the fluids will pass after these latter have flowed in contact with the reacting materials. It will be understood that the composition of the fluid which is withdrawn at the outlet of the tube is that which corresponds to that layer of reacting substances which, in the direction of flow of the fluid, immediately precedes the inert substances in the tube. It will be an easy matter to record the passing of the temperature gradient in said layer if steps have been taken to place a thermometer probe or temperature scanner therein. It will accordingly be possible to establish the spectrum of successive compositions of the fluid during the different states of treatment, either by constant sampling or by continuous analysis of the fluid which is derived from the tube, taken in relation to a continuous temperature reading.

It will as a rule be easier for the practical application of the present invention to make provision for a stationary reaction tube whilst the heating means are movable.

One example of practical operation of the present invention now follows below, said example being given without any limitation being implied, reference being made in the following description thereof to the accompanying drawings which illustrate a device for the application and study of the physical and chemical conditions of the steady-state operation of a shaft furnace employed for metallurgical reduction purposes.

Figure 1:
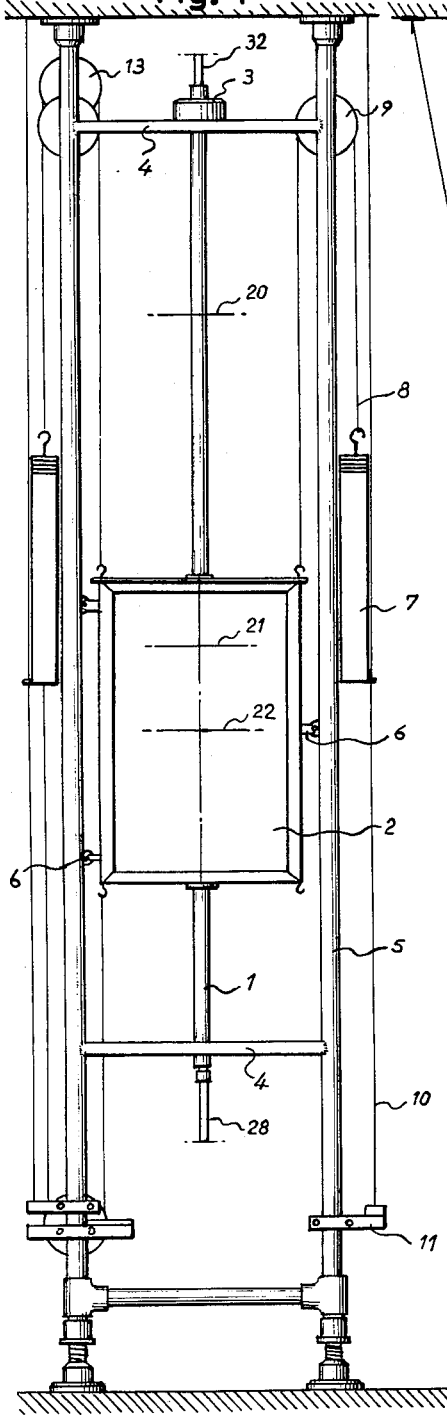
FIG. 1 represents a front view taken in elevation, of a device as referred-to above.
Figure 2:
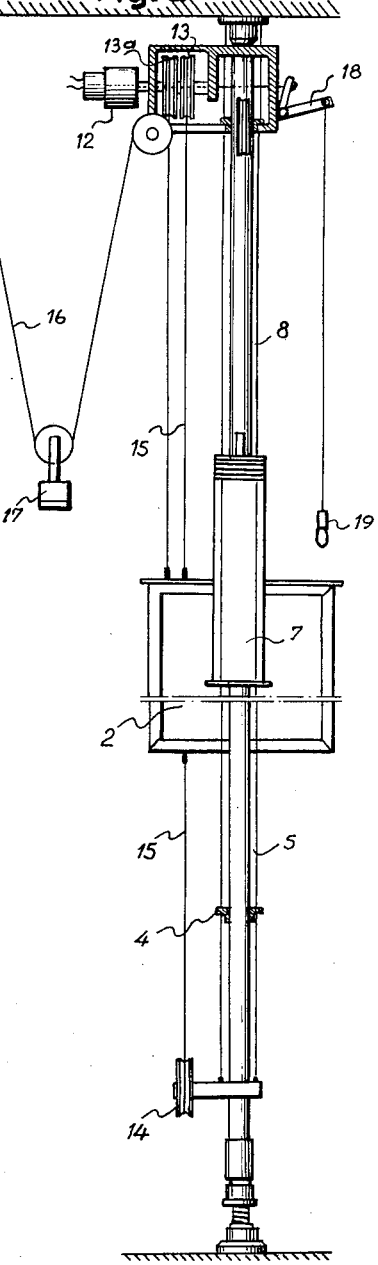
FIG. 2 is a side view of the same device looking on the left-hand side.
Figure 3:
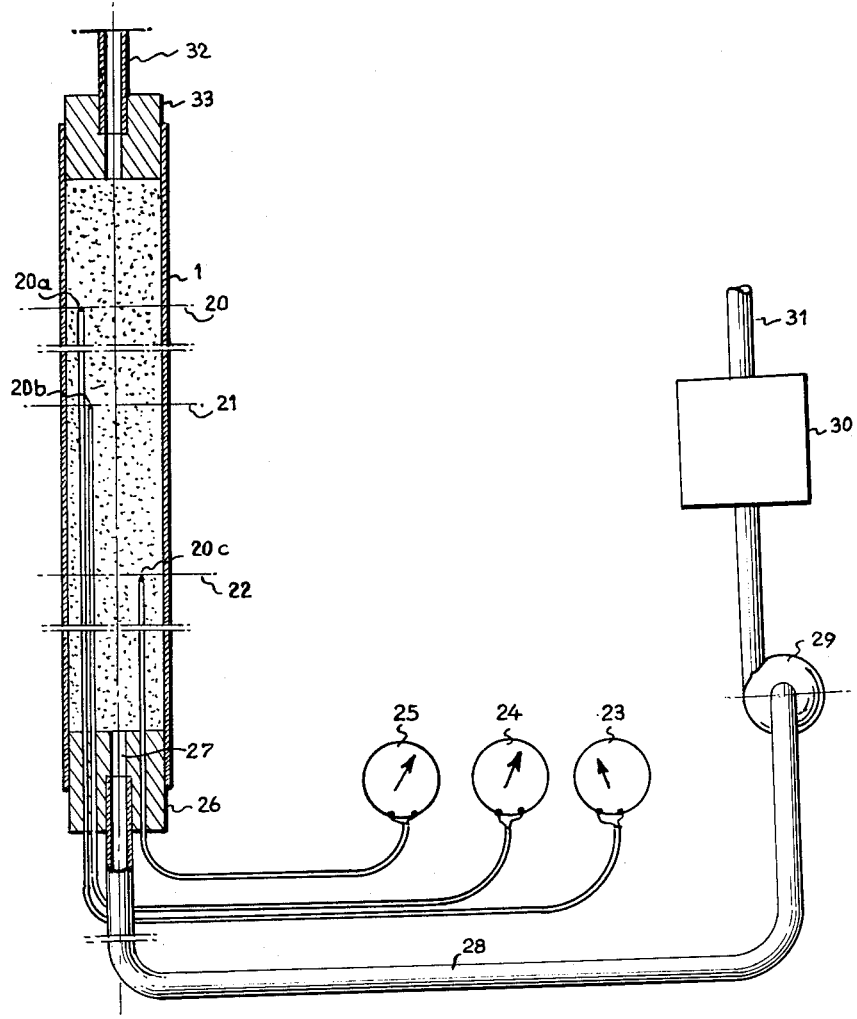
FIG. 3 illustrates the arrangement of the means for the measurement of temperature and analysis of gases in the device of FIG. 1.

In accordance with these drawings, a vertical reaction tube 1 of stainless steel is made to pass in a slidable manner through an electric furnace 2 with a tubular heating sleeve. The reaction tube is secured by means of a fastening collar 3 and angle-irons 4 to a tubular frame 5 which supports the complete device and which serves as a guide frame for the furnace during the upward and downward movements of this latter, the guiding of this latter being effected by means of rollers such as the roller 6. Two counterweights 7 balance the weight of the furnace which is suspended by means of a system of cables 8 and pulleys 9, the counterweights being guided by wires 10 held by angle-irons 11. An electric motor 12 fitted with a reduction-gear is adapted to engage a pulley 13 by means of a clutch-plate 13a. The pulley 13 drives the furnace by means of a cable 15 which passes over a guide pulley 14. The furnace is supplied with electric current through a power cable 16 which is tensioned by means of a loose pulley and a weight 17; finally, the references 18 and 19 designate respectively the lever and the control handle which serve to disengage the system for driving the movable furnace.

At levels indicated by the numerals 20, 21, 22, thermocouples 20a, 20b, 20c are fitted inside the tube 1 and connected to temperature indicators 23, 24 and 25 by means of electric supply leads which pass through a bottom plug 26. Said plug 26 is bored so as to form a passage 27 connected to a pipe 28 which is connected to a small pump 29. Said pump has the function of sucking the gas stream which is discharged from the tube and of directing said stream into a gas analyser 30 of known type. After the gases have been analysed, said gases are then withdrawn through a pipe 31.

A device of this type was employed for the experimental study of the thermal and physico-chemical characteristics of a steady-state reduction of sintered iron ore by a reducing gas, specifically a mixture of carbon monoxide and hydrogen which is similar to that which could result from the decompositon of methane. Said stream of reducing gas was introduced into the top portion of the tube 1 through a pipe 32 which is coupled to said tube by means of a connecting bush 33.

While the electric furnace performed a constant downward movement, said gas was introduced at room temperature into the top of the tube, whereas the gaseous products were withdrawn at the lower extremity, the flow of gas in the downward direction having the advantage of corresponding to the direction of spontaneous flow of the water which is formed as a result of the oxidation of hydrogen.

The heating circuit of the furnace consisted of three sections, the heating power outputs of which were regulated independently so as to provide high heating power at the top portion of the furnace in order to heat rapidly to 900° C. the reducing gas which is blown at room temperature, high heating power at the bottom portion of the furnace in order to bring to a temperature of 900° C. the solid agglomerate which is initially in the cold state, and finally a low heating power at the central portion of the furnace so as to provide a temperature stage at 900° C., along which no heat transfer occurs between the gas and the solids. The power supplied in said central zone served solely for the purpose of compensating heat losses.

With a view to carrying out a complete test, the operation was as follows. The upper extremity of the reaction tube which has previously been filled with agglomerate passed through the furnace, said furnace being immobilized for a period of 4 hours in this top positon. The gas flow had been cut off and the heating was turned on in order to bring up to temperature according to a static thermal outline which is characteristic of the setting of the power outputs of the different sections of the heating circuit. A thermocouple was fitted in said top portion of the tube and served to control the increase in temperature. The furnace was then set in motion at a rate of 1 meter per hour and at this moment, the admission of reducing gas was opened and the gas arrived at the top of the tube at a constant rate and with a constant composition.

After the furnace had been set in motion, a new thermal state was established: cold agglomerate was continuously charged and a countercurrent gas flow, taken at room temperature, was caused to react on the agglomerate in the furnace after having been heated on the discharged products and in the thermal field of the top portion of the furnace. After a certain time, the thermal state was constant, as could be ascertained by observing the identity of thermal outlines described by two thermocouples placed at a distance of a few centimeters from each other in a zone of the tube which is distant from the upper extremity thereof by approximately twice the length of the furnace. The depleted gases which passed out of the tube were collected and analyzed continuously starting from the moment when said zone was charged and the constancy of analysis of said gases constituted an additional proof that a steady-state reaction had been established.

When the furnace had once again travelled over a distance corresponding to its full height, the heating and the gas-supply circuit were cut off, the furnace was quickly lifted and the hot zone was immediately sprinkled with water. The products were then extracted in successive layers in the tube and the analysis of these latter provided information on all the intermediate stages of the reduction in continuous working under the conditions considered.

In a second type of experiment, the grains of ore in the bottom portion of the tube were replaced by alumina grains up to a height at least equal to that of the furnace, following which the charging of the tube was completed up to the top with normal grains of sintered ore, without omitting to set in position the various temperature scanners as in the previous experiment, the bottom thermocouple being located at the level of the section of contact between the alumina grains and the ore. The process was commenced as in the previous experiment until the moment when the charging of the alumina was begun. The depleted gases were then directed into a continuous-analysis apparatus which indicated the composition of said gases as a function of the thermal outline described.

It can be seen from two experiments which were conducted in accordance with the invention that it is possible by means of the device for practical application as heretofore described, to acquire detailed information on the composition of the different elements in equilibrium during all the stages of a reduction reaction in steady-state operation and that, as a result of two series of similar experiments, it would be possible to determine the respective influences of a number of parameters such as temperature, particle-size distribution, nature of the gas, etc.

It will naturally be understood that the present description must only be considered as an example of practical application which is not limitative in any respect whatsoever and is not intended to restrict the field of application of the present invention, and that it would be possbile to devise any number of alternative forms and detail improvements and similarly to contemplate the use of equivalent means, without thereby departing from the scope of the present invention. It accordingly follows that the electric furnace could be replaced by high-frequency induction heating coils and that the reaction tube could be horizontal and even toric, or else could be put to use only over a part of its length, or alternatively that the furnace could be stationary while the tube is movable, or that reactions other than reduction could be studied, for example oxidation. It would also be possible to study other steady states, for example the steady state operation of an industrial reactor in which the reactor shaft would be at a temperature which is lower than room temperature, by means of a device in accordance with the invention in which the movable heat source would be a cold source within the customary thermodynamic meaning of the term, that is to say a source which is constituted by a means for reducing in accordance with a predetermined thermal outline the temperature of a zone which is displaced along the tube, without thereby departing either from the scope or the spirit of the invention.

What is claimed is:

1. A method of duplicating on a reduced scale the reactions occurring in a shaft furnace wherein solid and fluid materials pass through the furnace according to a predetermined program and are subjected during such passage to heat treatment at a predetermined elevated temperature distribution, comprising the steps of forming a column of solids corresponding on a small scale to the distribution of solids in the shaft furnace; passing fluid through said column of solids corresponding to the passage of fluid through the shaft furnace; exposing said column of solids with said fluid passing therethrough to said predetermined elevated temperature distribution, whereby the solids in said column will be subjected to conditions similar to those prevailing in the shaft furnace; suddenly cooling at least a portion of said column of solids; and withdrawing the cooled portion of solids so that the same may be subjected to analysis.

2. A method of studying on a reduced scale the steady-state operation of an industrial shaft reactor through which pass streams of fluids and solids adapted to react with each other, comprising the steps of forming a column of said solids; heating a zone of predetermined length by heating means separate from said column, said length being less than the total length of said column, said heating being effected according to a thermal outline which corresponds to that of the shaft of said reactor; displacing said heating means along said column for displacing said zone while maintaining said thermal outline of said heated zone; and simultaneously causing a stream of reacting fluid to flow through said column in contact with said solids thereof.

3. A method according to claim 2 wherein the zone of predetermined length is heated by a heat source progressing in axial direction of said column.

4. A method of studying on a reduced scale the steady-state operation of an industrial shaft reactor through which pass streams of fluids and solids adapted to react with each other, comprising the steps of forming a column of said solids; heating a zone of predetermined length being less than the total length of said column according to a thermal outline which corresponds to that of the shaft of said reactor, said column including a longitudinal portion consisting of at least one chemically inert solid substance, said portion having a length which is at least equal to said predetermined length of the heating zone and said portion being located upstream of said reactive solids so that said stream of fluids will pass first through said reactive solids and thereafter through said inert solid substance; displacing said heated zone along said column while maintaining said thermal outline of said heated zone; simultaneously causing a stream of reacting fluid to flow through said column in contact with said solids thereof; and collecting said fluid as it emanates from the inert solid portion of said column while the boundary between the inert solid substance and the reactive solids of said column is heated according to said thermal outline.

5. A method of studying on a reduced scale the steady-state operation of an industrial shaft reactor through which pass streams of fluids and solids adapted to react with each other, comprising the steps of forming a column of said solids; heating a zone of predetermined length being less than the total length of said column according to a thermal outline which corresponds to that of the shaft of said reactor; displacing said heated zone along said column while maintaining said thermal outline of said heated zones; simultaneously causing a stream of reacting fluid to flow through said column in contact with said solids thereof; quickly interrupting the heating of said column and the flow of fluids therethrough; abruptly cooling at least the zone of the column which was heated at the moment of interruption of the heating; and withdrawing in successive layers the solids of said abruptly cooled zone.

References Cited by the Examiner

UNITED STATES PATENTS

| | | | |
|---|---|---|---|
| 1,719,331 | 7/1929 | Kemp | 263—5 |
| 2,009,814 | 7/1935 | Podbielniak | 23—253 X |
| 2,490,252 | 12/1949 | Brewer | 263—4 X |
| 2,550,126 | 4/1951 | Snow | 23—253 X |
| 2,556,116 | 6/1951 | Smith | 263—2 |
| 2,567,007 | 9/1951 | Brassert et al. | 266—25 |
| 2,659,219 | 11/1954 | Upham | 266—25 X |

FOREIGN PATENTS 878,399  9/1951  Great Britain.

EUGENE R. CAPOZIO, *Primary Examiner.*

JEROME SCHNALL, *Examiner.*

HARLAND SKOGQUIST, *Assistant Examiner.*